United States Patent [19]

Komoto

[11] Patent Number: 4,588,266
[45] Date of Patent: May 13, 1986

[54] FILTER DEVICE FOR REFLEX OPTICAL SYSTEM ZOOM LENS

[75] Inventor: Shinsuke Komoto, Tokyo, Japan

[73] Assignee: Asahi Kogaku Kogyo Kabushiki Kaisha, Tokyo, Japan

[21] Appl. No.: 301,067

[22] Filed: Sep. 10, 1981

[30] Foreign Application Priority Data

Sep. 10, 1980 [JP] Japan .............. 55-128630[U]

[51] Int. Cl.$^4$ ............................................. G02B 5/22
[52] U.S. Cl. .................................. 350/439; 350/315
[58] Field of Search ........................... 350/439, 315

[56] References Cited
U.S. PATENT DOCUMENTS 2,460,507  2/1949  Johnston ..................... 350/439
2,687,669  8/1954  Bolsey ....................... 350/315
3,914,024 10/1975  Tanabe et al. ............... 350/315

Primary Examiner—John K. Corbin
Assistant Examiner—Rebecca D. Gass
Attorney, Agent, or Firm—Sughrue, Mion, Zinn, Macpeak and Seas

[57] ABSTRACT

A filter device for a reflex optical system zoom lens having a front group of lenses and a rear group of lenses has filters in turret form located between said front and rear group of lenses and means for rotating the filters as a filter ring is turned. Since the diameter of a bundle of rays in the rear part of the zoom lens utilizing a reflex optical system is larger than the diameter of the bundle of rays between the front and rear groups of lenses, the size and weight of the filters is substantially reduced.

5 Claims, 5 Drawing Figures

FILTER DEVICE FOR REFLEX OPTICAL SYSTEM ZOOM LENS

BACKGROUND OF THE INVENTION

As is well known in the art, no lens stop is provided for a lens utilizing a reflex optical system, and therefore an ND filter for optical intensity adjustment or an ordinary filter is disposed behind the optical system. These filters may be built in a large lens utilizing a reflex optical system. In order to reduce the size and weight of such a lens, the filter is screwed into or inserted into the rear part thereof. However, this method is disadvantageous in that it is troublesome to exchange the filter or the filter may be lost.

In the case of a zoom lens utilizing a reflex optical system, the diameter of the bundle of rays in the rear part thereof is changed by zooming, and therefore a filter having a larger diameter is needed. Heretofore, it has been difficult to build filters small in size and weight in a reflex telephoto lens.

SUMMARY OF THE INVENTION

An object of the present invention is to provide a filter device for a reflex optical system zoom lens in which a filter is provided between a front group of lenses and a rear group of lenses so that the diameter, and therefore the size and weight, of the filter can be reduced. Filters in turret form can be built in, and a filter exchanging ring is provided at a position where, in the case of the ordinary lens, an aperture scale ring is provided.

DESCRIPTION OF THE PREFERRED EMBODIMENTS

Figure 1:
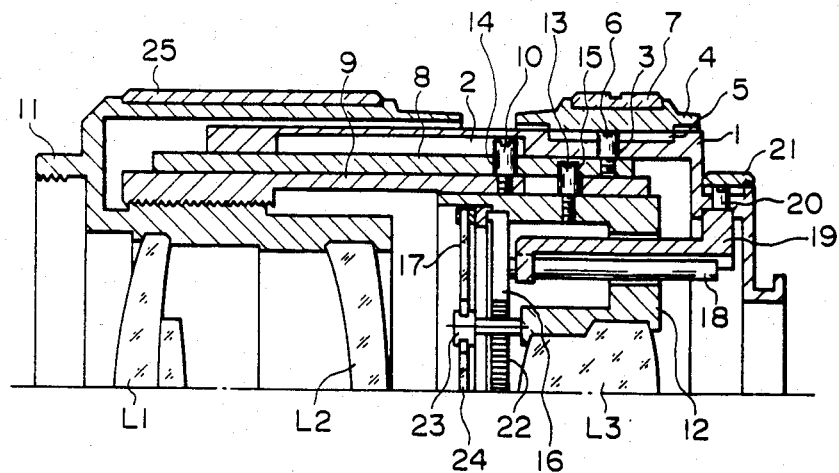
FIG. 1 is a sectional side view showing one embodiment of the present invention.

FIG. 1 is a sectional side view of one embodiment of the present invention. A stationary cylinder 1 having a mount has a straight moving guide groove 2 and a turning groove 3. A zooming ring 4 can only turn around the stationary cylinder 1 and has a straight groove 5 in which a pin 6 is fitted. The zooming ring 4 has a zooming decoration ring 7. the pin 6 is embedded in a rotary ring 8 and is inserted in the turning groove 3. An outer helicoid 9 is fitted in the rotary ring 8, and a pin 10 is embedded in the outer helicoid 9. A front frame 11 is rotatably coupled to the outer helicoid 9 through the helicoid surface. A focusing decoration ring 26 for distance adjustment is provided on the outside of the outer helicoid 9. The front frame 11 has a lens $L_1$ with a convex mirror and a reflecting mirror lens $L_2$ which form a front group of zooming lenses. A rear frame 12 is fitted in the outer helicoid 9 and has a rear group of lenses $L_3$. A pin 13 is embedded in the rear frame 12. A front group groove 14 and a rear group groove 15 are cut in the rotary ring 8 to move the front and rear groups of lenses in a predetermined relation. A rotary ring 16 is thrusted and retained by a retaining ring 17, but it is rotatable with respect to the rear frame 12. A turning pin 18 (second pin) is embedded in the rotary ring 16 in such a manner that it is in association with a filter turning ring 19. A pin 20 (first pin) embedded in the filter turning ring 19 is coupled to a filter ring 21. A first gear 22, a filter frame 23 and a filter 24 are turned as one unit, and are coupled to the rear frame 12.

Figure 2:
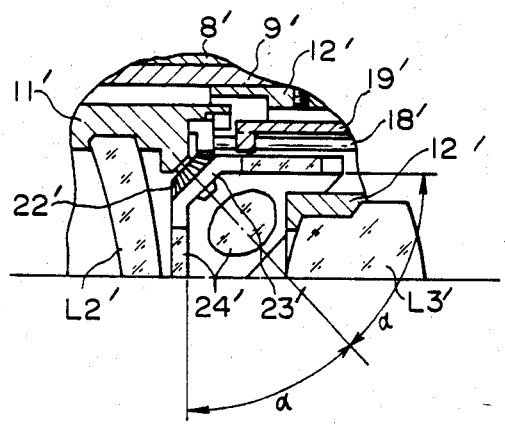
FIG. 2 is a sectional view showing a part of another embodiment of the present invention.

FIG. 2 shows another example of the filter section. Those elements identical to FIG. 1 are designated with primes ('). In the example, a gear 22', a filter frame 23' and a filter 24' are coupled to a front frame 11', and accordingly a rotary ring 16', a retaining ring 17' and a turning pin 18' are coupled to a front frame 11'. The bevel angel of the filter frame 23' is 45° in the example. It is effective in reducing the space in the radial direction to set the bevel angle to about 30° to 60°.

Figure 3:
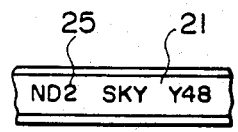
FIG. 3 is an explanatory diagram showing filter kind names on a filter ring.
Figure 4A:
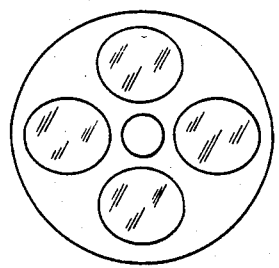
Figure 4B:
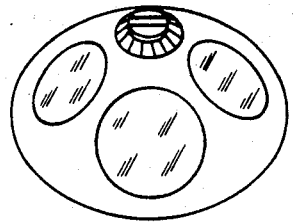

FIG. 3 shows filter kind names 25 provided on the filter ring 21 described above. Utilizing the feature that no lens stop is provided for the reflex optical system, the filter ring 21 with the filter kind names 25 is set at a position where, in the case of the ordinary lens, the aperture scale ring is provided, so that the filter kind names 25 are displayed through an aperture reading window in the camera body.

The operation of the filter device set forth above will now be described.

When the zooming decoration ring 7 is turned, the pin 6 is also turned simultaneously causing the rotary ring 9 to turn. However, the rotary ring 8 is not moved in the direction of the optical axis, the rotary ring 8 being regulated by the turning groove 3. The pins 10 and 13, engaged with the frong group groove 14 and the rear group groove 15, are moved as much as the amounts of advancement of the front and rear group grooves 14 and 15 as the rotary ring 8 is turned. In other words, the outer helicoid 9 and the rear frame 12 in which the pins 10 and 13 are respectively embedded are moved in the same way, so that the front group of lenses $L_1$ and $L_2$ and the rear group of lenses $L_3$ are moved to change the focal distance. Since the front frame 11 is coupled to the outer helicoid 9 through the helicoid surface, focusing can be effected by turning the front frame 11.

As the filter ring 21 is turned, the filter turning ring 19 is turned through the pin 20. The turning pin 18 follows the rotation of the filter turning ring 19 to turn the rotary ring 16. Since the inside of the rotary ring 16 is formed into a gear, the gear 22 is turned. Therefore, the filter 24 integral with the gear 22 is turned.

The embodiment shown in FIG. 2 can be employed in the case where it is impossible to provide the turret type filter as shown in FIG. 1 because of a narrow space. That is, it is intended to perform the same function by arranging the filters in the form of an umbrella. Since the diameter of the bundle of rays in the rear part of a zoom lens utilizing a reflex optical system is large, the filters are provided between the front group of lenses and the rear group of lenses where the bundle of rays diameter is small. To this end, a space is provided outside the rear group of lenses to incorporate the filters according to the present invention. Therefore, in accordance with the present invention, the filters can be readily exchanged and the filters will never be lost.

What is claimed is:

1. A filter device for a reflex optical system zoom lens comprising:

a front group of lenses and a rear group of lenses which utilize a reflex optical system;

a rotatable turret comprising a filter frame holding a plurality of filters;

said turret provided between said front group of lenses and said rear group of lenses of a reflex optical system zoom lens;

a filter ring;

first gear means coupled to said turret and;

operating means responsive to movement of said filter ring to engage said gear means and rotate said turret as said filter ring is turned.

2. The device claimed in claim 1, further comprising said filter frame having a bevel angle of from 30° to 60°.

3. The device claimed in claim 1 or 2, wherein said filter ring has filter kind names thereon in such a manner that said filter kind names are displayed through an aperture reading window in a camera body.

4. The device claimed in claim 1 wherein said operating means comprises; a filter turning ring, first and second pins, a rotary ring, and said gear means having said filters integral therewith, wherein turning of said filter ring turns said first pin and said filter turning ring, and turning of said filter turning ring turning said second pin, said rotary ring and said gear means to turn so as to turn said filter.

5. The device claimed in claim 4 wherein said rotary ring comprises second gear means integral therewith, said second gear means adapted to be engagable with said gear means.

* * * * *